(12) United States Patent
Maruyama et al.

(10) Patent No.: US 10,538,630 B2
(45) Date of Patent: Jan. 21, 2020

(54) SILICONE-MODIFIED POLYBENZOXAZOLE RESIN AND MAKING METHOD

(71) Applicant: Shin-Etsu Chemical Co., Ltd., Tokyo (JP)

(72) Inventors: Hitoshi Maruyama, Annaka (JP); Ryuto Hayashi, Annaka (JP); Kazunori Kondo, Annaka (JP); Hideyoshi Yanagisawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 130 days.

(21) Appl. No.: 15/886,198

(22) Filed: Feb. 1, 2018

(65) Prior Publication Data

US 2018/0223049 A1    Aug. 9, 2018

(30) Foreign Application Priority Data

Feb. 3, 2017  (JP) .................. 2017-018371

(51) Int. Cl.
| | |
|---|---|
| *C08G 81/02* | (2006.01) |
| *C08G 77/442* | (2006.01) |
| *C08F 226/06* | (2006.01) |
| *C08K 5/5419* | (2006.01) |
| *C08F 224/00* | (2006.01) |
| *C08G 77/04* | (2006.01) |
| *C08G 77/00* | (2006.01) |

(52) U.S. Cl.
CPC .......... *C08G 81/024* (2013.01); *C08F 224/00* (2013.01); *C08F 226/06* (2013.01); *C08G 77/045* (2013.01); *C08G 77/442* (2013.01); *C08G 77/80* (2013.01); *C08K 5/5419* (2013.01)

(58) Field of Classification Search
CPC ..................................... C08G 81/02
USPC ........................................ 528/408
See application file for complete search history.

(56) References Cited

U.S. PATENT DOCUMENTS

| 7,256,248 | B2 | 8/2007 | Sugo |
| 9,477,148 | B1 | 10/2016 | Jeng et al. |

FOREIGN PATENT DOCUMENTS

| CN | 103342878 A | 10/2013 |
| EP | 1 396 515 A1 | 3/2004 |
| JP | 2004-051781 A | 2/2004 |
| JP | 2004-99638 A | 4/2004 |

OTHER PUBLICATIONS

Extended European Search Report dated Jul. 13, 2018, issued in counterpart European Application No. 18154608.6. (7 pages).

*Primary Examiner* — Duc Truong
(74) *Attorney, Agent, or Firm* — Westerman, Hattori, Daniels & Adrian, LLP

(57) ABSTRACT

A silicone-modified polybenzoxazole resin comprising repeating units of formulae (1a) and (1b) is prepared by addition polymerization. $R^1$ to $R^4$ are a $C_1$-$C_8$ monovalent hydrocarbon group, m and n are integers of 0-300, $R^5$ is $C_1$-$C_8$ alkylene or phenylene, a and b are positive numbers of less than 1, a+b=1, and $X^1$ is a divalent linker of formula (2). The resin is flexible, soluble in organic solvents, and easy to use.

5 Claims, No Drawings

SILICONE-MODIFIED POLYBENZOXAZOLE RESIN AND MAKING METHOD

CROSS-REFERENCE TO RELATED APPLICATION

This non-provisional application claims priority under 35 U.S.C. § 119(a) on Patent Application No. 2017-018371 filed in Japan on Feb. 3, 2017, the entire contents of which are hereby incorporated by reference.

TECHNICAL FIELD

This invention relates to a silicone-modified polybenzoxazole resin and a method for preparing the same.

BACKGROUND ART

Polyimide resins are widely used due to their heat resistance and electrical insulation. However, polyimide resins have several drawbacks including poor flexibility because of rigidity, difficulty to use because of high glass transition temperature (Tg), and low solubility in organic solvents. To overcome these drawbacks, Patent Document 1 proposes a silicone-modified polyimide resin.

Also, polybenzoxazole resins have excellent heat resistance and electrical insulation and are thus widely used as resin varnishes for electronic parts and flexible printed circuit board materials. Like the polyimide resins, polybenzoxazole resins have several drawbacks including poor flexibility because of rigidity, and difficulty to use because of high Tg, and low solubility in organic solvents.

CITATION LIST

Patent Document 1: JP-A 2004-099638 (U.S. Pat. No. 7,256,248, EP 1396515)

SUMMARY OF INVENTION

An object of the invention is to provide a polybenzoxazole resin having flexibility, high solubility in organic solvents, and easy use, and a method for preparing the resin.

The inventors have found that the above and other objects are achieved by a specific silicone-modified polybenzoxazole resin.

In one aspect, the invention provides a silicone-modified polybenzoxazole resin comprising repeating units having the formula (1a) and repeating units having the formula (1b):

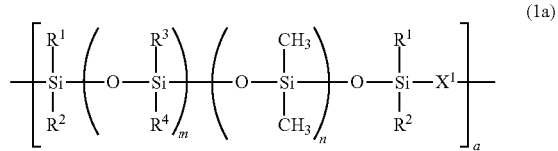

(1a)

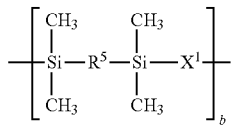

(1b)

wherein $R^1$ to $R^4$ are each independently a $C_1$-$C_8$ monovalent hydrocarbon group which may contain a glycidyl, acryloyl or methacryloyl moiety, m and n are each independently an integer of 0 to 300, $R^5$ is a straight, branched or cyclic $C_1$-$C_8$ alkylene group or phenylene group, a and b are positive numbers in the range: $0<a<1$, $0<b<1$, and $a+b=1$, and $X^1$ is a divalent linker having the following formula (2):

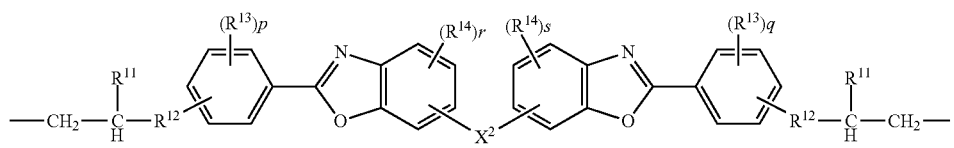

(2)

wherein $X^2$ is a single bond or divalent organic group, $R^{11}$ is each independently hydrogen or a $C_1$-$C_8$ monovalent hydrocarbon group in which some hydrogen may be substituted by halogen, $R^{12}$ is each independently a straight, branched or cyclic $C_1$-$C_8$ alkylene group in which any methylene moiety may be substituted by an ether bond or phenylene moiety, $R^{13}$ is each independently a hydroxyl, $C_1$-$C_8$ monovalent hydrocarbon or glycidyloxy group, $R^{14}$ is each independently a $C_1$-$C_8$ monovalent hydrocarbon group in which some hydrogen may be substituted by halogen, p and q are each independently an integer of 0 to 4, and r and s are each independently an integer of 0 to 3.

The polybenzoxazole resin preferably has a Mw of 3,000 to 500,000.

Preferably, $X^2$ is a group selected from the following groups:

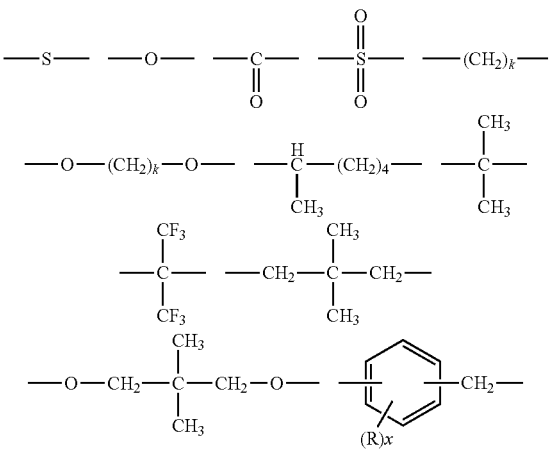

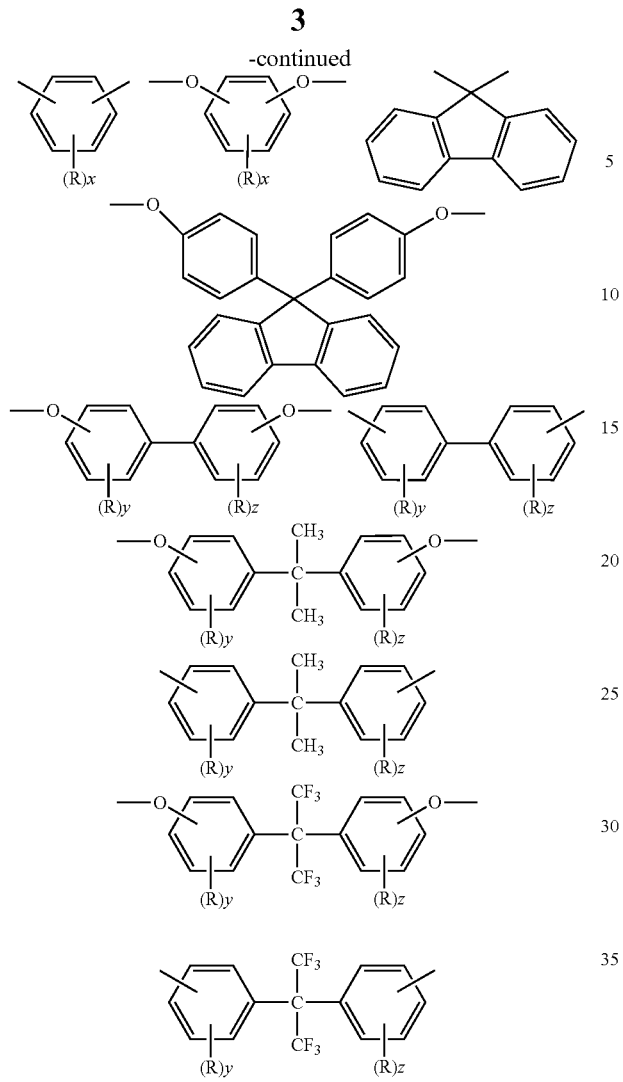
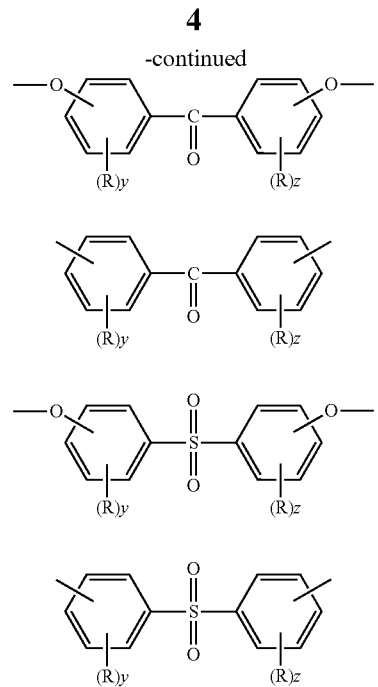

wherein R is each independently halogen, or a straight, branched or cyclic $C_1$-$C_8$ alkyl or haloalkyl group, k is an integer of 1 to 6, x is an integer of 0 to 4, and y and z are each independently an integer of 0 to 4.

A resin coating comprising the silicone-modified polybenzoxazole resin is also contemplated.

In another aspect, the invention provides a method for preparing the silicone-modified polybenzoxazole resin, comprising the step of effecting addition polymerization of an organopolysiloxane having the following formula (1-A), a compound having the following formula (1-B), and a benzoxazole compound having the following formula (2-A),

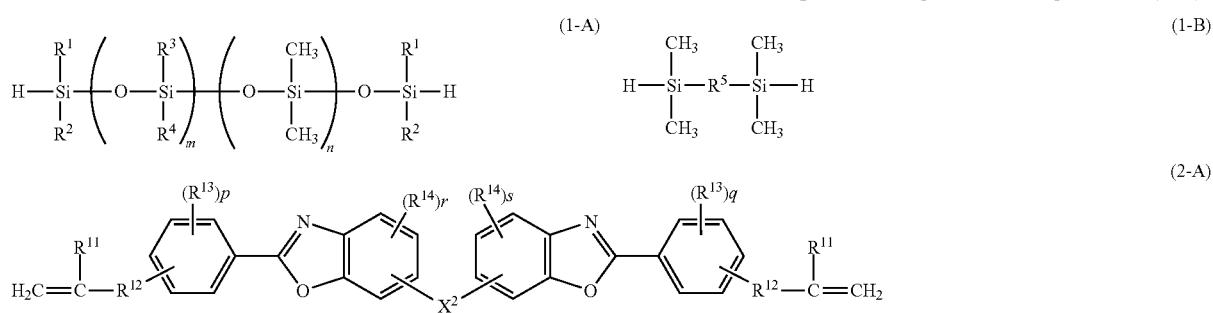

wherein $R^1$ to $R^5$, $R^{11}$ to $R^{14}$, $X^2$, m, n, p, q, r and s are as defined above.

In a further aspect, the invention provides a benzoxazole compound having the following formula (2-A):

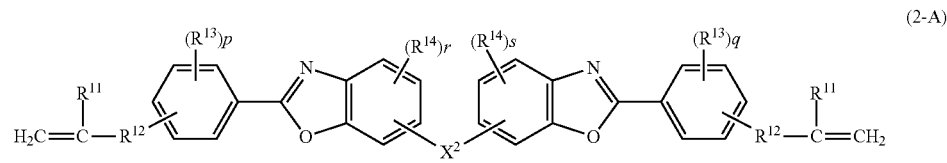

wherein $R^{11}$, $R^{12}$, $R^{13}$, $R^{14}$, p, q, r, s, and $X^2$ are as defined below.

In a still further aspect, the invention provides a method for preparing the benzoxazole compound defined above, comprising the step of reacting a compound having the following formula (2-B), a compound having the following formula (2-C), and a compound having the following formula (2-D).

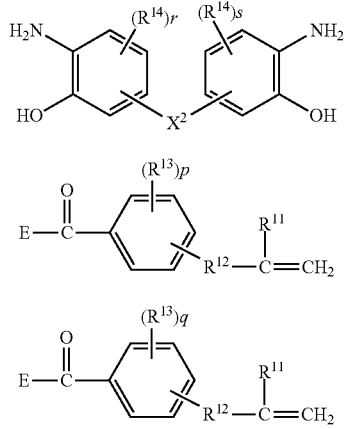

Herein $R^{11}$ to $R^{14}$, $X^2$, p, q, r and s are as defined above, and E is a leaving group selected from hydrogen, hydroxyl, halogen, a straight, branched or cyclic $C_1$-$C_8$ alkoxy group, and phenoxy group.

Advantageous Effects of Invention

The silicone-modified polybenzoxazole resin readily forms a resin coating by heat treatment. The resin coating has high resistance to organic solvents and exhibits good adhesion and bond to metal substrates (e.g., copper), glass, and semiconductor substrates (e.g., silicon substrate, silicon nitride film, and silicon oxide film) and durability even under humid conditions. Therefore, the silicone-modified polybenzoxazole resin is useful for the surface protection of various metals and as a protective material for semiconductor devices and various substrates, an adhesive, a heat resistant paint, and the like. The inventive method of preparing the silicone-modified polybenzoxazole resin is simple and efficient to produce the target compound.

DESCRIPTION OF PREFERRED EMBODIMENTS

As used herein, the notation (Cn-Cm) means a group containing from n to m carbon atoms per group.

Silicone-Modified Polybenzoxazole Resin

One embodiment of the invention is a silicone-modified polybenzoxazole resin comprising repeating units having the formula (1a) and repeating units having the formula (1b).

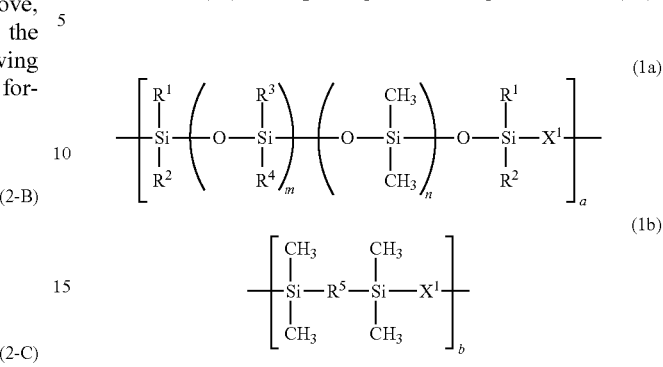

In formula (1a), $R^1$ to $R^4$ are each independently a $C_1$-$C_8$ monovalent hydrocarbon group which may contain a glycidyl, acryloyl or methacryloyl moiety. Suitable monovalent hydrocarbon groups include straight, branched or cyclic alkyl and aromatic groups.

Examples of the alkyl group include methyl, ethyl, n-propyl, isopropyl, cyclopropyl n-butyl, isobutyl, sec-butyl, tert-butyl, cyclobutyl, n-pentyl, cyclopentyl, n-hexyl, cyclohexyl, n-heptyl, and n-octyl. Examples of the aromatic group include phenyl, benzyl, phenethyl, tolyl, and xylyl. Of these, $C_1$-$C_6$ alkyl and phenyl groups are preferred, with methyl and phenyl being more preferred.

In formula (1b), $R^5$ is a straight, branched or cyclic $C_1$-$C_8$ alkylene group or phenylene group. Examples of the alkylene group include methylene, ethylene, trimethylene, propylene, and tetramethylene. Of these, methylene and phenylene are preferred, with phenylene being more preferred.

The subscript m and n are each independently an integer of 0 to 300, preferably 0 to 200, and more preferably 0 to 100. The subscript a and b are positive numbers in the range: $0<a<1$, $0<b<1$, and $a+b=1$, preferably $0.05 \leq a \leq 0.8$ and $0.2 \leq b \leq 0.95$, more preferably $0.1 \leq a \leq 0.7$ and $0.3 \leq b \leq 0.9$.

In formulae (1a) and (1b), $X^1$ is a divalent linker having the formula (2).

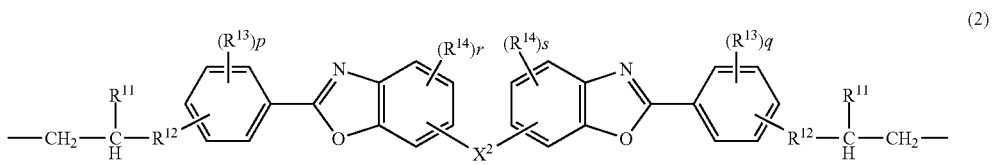

In formula (2), $X^2$ is a single bond or divalent organic group. $R^{11}$ is each independently hydrogen or a $C_1$-$C_8$ monovalent hydrocarbon group in which one or more hydrogen atoms may be substituted by halogen atoms. $R^{12}$ is each independently a straight, branched or cyclic $C_1$-$C_8$ alkylene group in which any methylene moiety may be substituted by an ether bond or phenylene moiety. $R^{13}$ is each independently a hydroxyl, $C_1$-$C_8$ monovalent hydrocarbon or glycidyloxy group. $R^{14}$ is each independently a $C_1$-$C_8$ monovalent hydrocarbon group in which one or more hydrogen atoms may be substituted by halogen atoms.

Examples of the $C_1$-$C_8$ monovalent hydrocarbon group include straight, branched or cyclic alkyl and aromatic groups, with $C_1$-$C_6$ alkyl groups being preferred. The alkyl and aromatic groups are as exemplified above.

In formula (2), p and q are each independently an integer of 0 to 4, preferably 0 or 1; and r and s are each independently an integer of 0 to 3, preferably 0.

The divalent organic group represented by $X^2$ is preferably selected from the following groups.

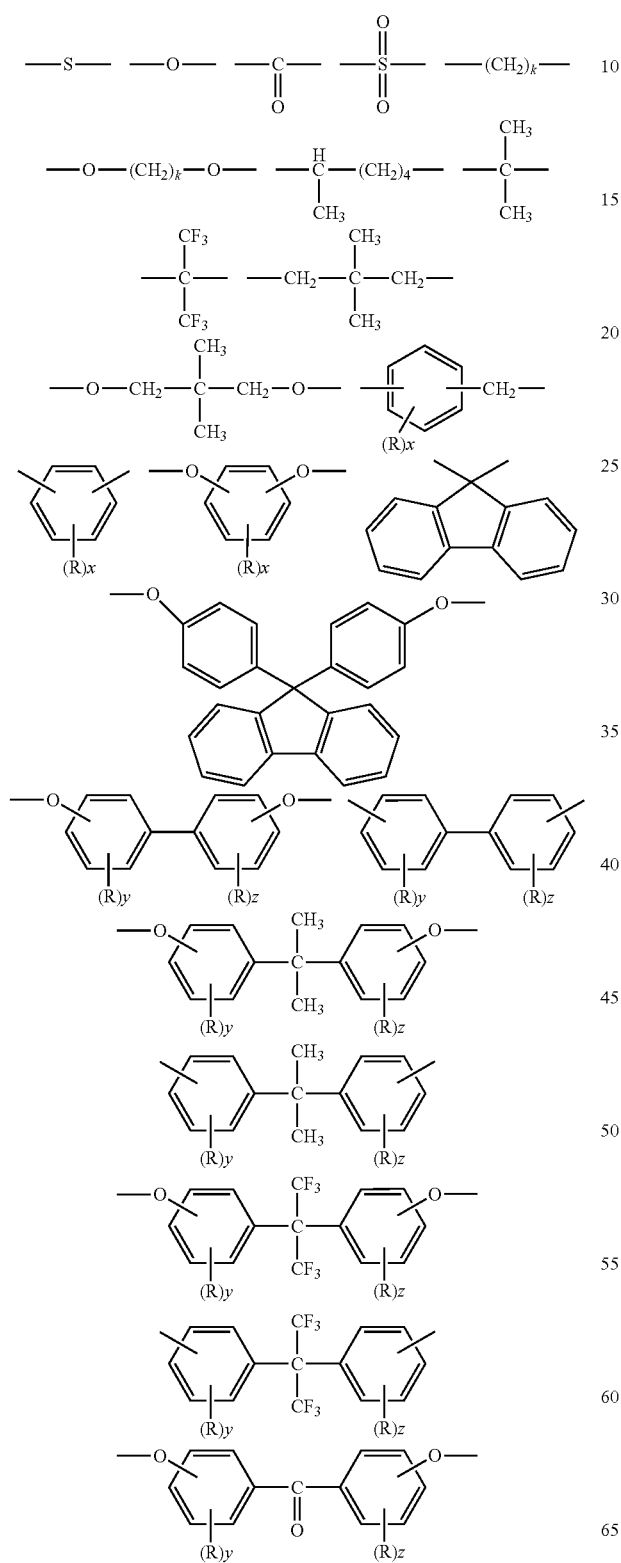

Herein R is each independently halogen, or a straight, branched or cyclic $C_1$-$C_8$ alkyl or haloalkyl group, k is an integer of 1 to 6, x is an integer of 0 to 4, preferably 0 to 2, and y and z are each independently an integer of 0 to 4, preferably 0 to 2.

Of these, the following groups are more preferred as $X^2$.

-continued
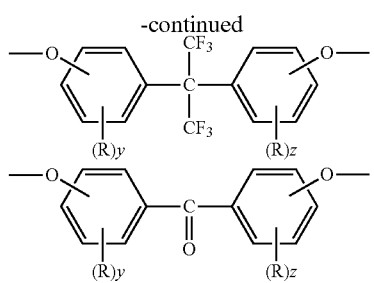
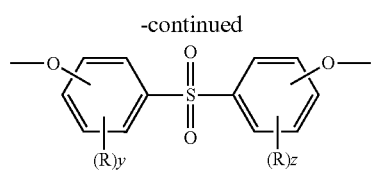
Herein R, x, y and z are as defined above.
Examples of the linker $X^1$ include the following groups, but are not limited thereto.
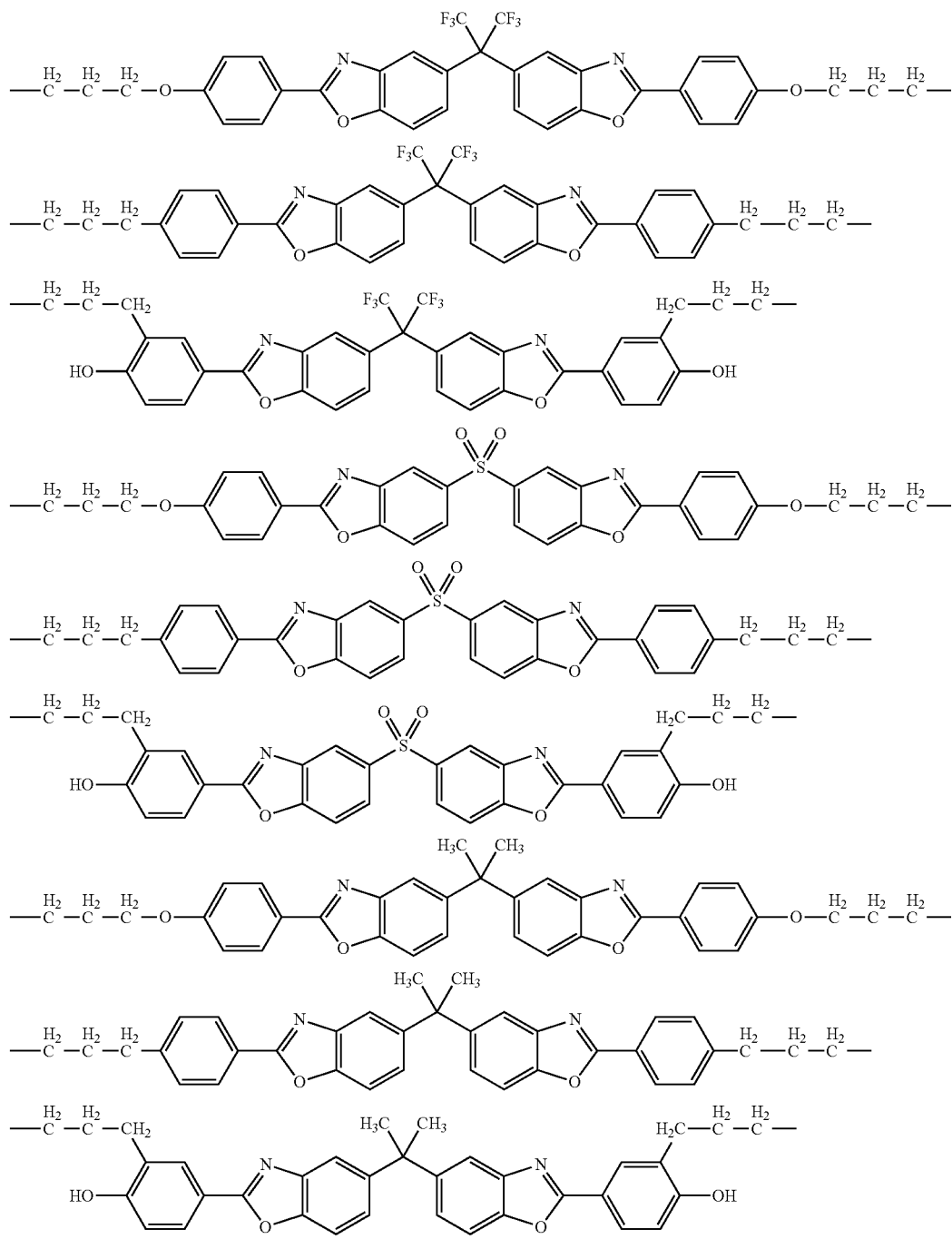

The silicone-modified polybenzoxazole resin may be a random or block copolymer. The polybenzoxazole resin preferably has a silicone (or siloxane unit) content of 30 to 80% by weight.

The silicone-modified polybenzoxazole resin preferably has a weight average molecular weight (Mw) of 3,000 to 500,000, more preferably 5,000 to 200.000. It is noted throughout the disclosure that Mw is measured by gel permeation chromatography (GPC) versus polystyrene standards using tetrahydrofuran as the elute.

Method of Preparing Silicone-Modified Polybenzoxazole Resin

The silicone-modified polybenzoxazole resin may be prepared by addition polymerization of an organopolysiloxane having the formula (1-A), a compound having the formula (1-B), and a benzoxazole compound having the formula (2-A), shown below.

resulting resin. It is preferably about 0.5 to about 100 hours, more preferably about 0.5 to about 30 hours for preventing moisture entry into the polymerization system. After the completion of reaction, the solvent (if used) is distilled off, whereupon the desired silicone-modified polybenzoxazole resin is obtained.

The reaction procedure is not particularly limited. The preferred procedure is by first adding a compound having formula (2-A) to a solvent, heating, adding a metal catalyst to the mixture, and then adding compounds having formulae (1-A) and (1-B) dropwise over 0.1 to 5 hours.

In the addition polymerization, the reactants are preferably combined in such amounts that a molar ratio of the total amount of hydrosilyl groups in the compounds having formulae (1-A) and (1-B) to the total amount of alkenyl groups in the compound having formula (2-A) may range from 0.67 to 1.67, more preferably from 0.83 to 1.25. The

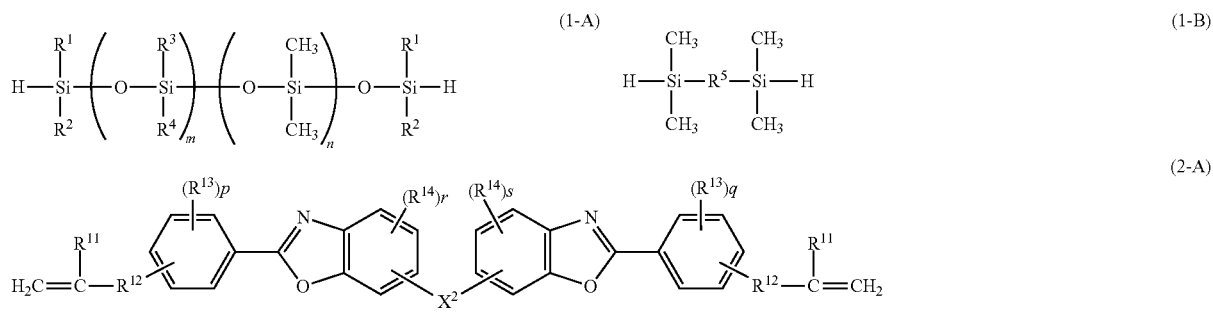

Herein $R^1$ to $R^5$, $R^{11}$ to $R^{14}$, $X^2$, m, n, p, q, r and s are as defined above.

The addition polymerization reaction is preferably performed in the presence of a metal catalyst. Examples of the catalyst used include platinum group metals alone such as platinum (including platinum black), rhodium and palladium; platinum chlorides, chloroplatinic acids and chloroplatinates such as $H_2PtCl_4 \cdot xH_2O$, $H_2PtCl_6 \cdot xH_2O$, $NaHPtCl_6 \cdot xH_2O$, $KHPtCl_6 \cdot xH_2O$. $Na_2PtCl_6 \cdot xH_2O$, $K_2PtCl_4 \cdot xH_2O$, $PtCl_4 \cdot xH_2O$, $PtCl_2$ and $Na_2HPtCl_4 \cdot xH_2O$, wherein x is preferably an integer of 0 to 6, more preferably 0 or 6; alcohol-modified chloroplatinic acids as described in U.S. Pat. No. 3,220,972; chloroplatinic acid-olefin complexes as described in U.S. Pat. No. 3,159,601, U.S. Pat. No. 3,159,662 and U.S. Pat. No. 3,775,452; supported catalysts comprising platinum group metals such as platinum black and palladium on supports of alumina, silica and carbon; rhodium-olefin complexes; chlorotris(triphenylphosphine)rhodium (known as Wilkinson's catalyst); and complexes of platinum chlorides, chloroplatinic acids and chloroplatinates with vinyl-containing siloxanes, specifically vinyl-containing cyclosiloxanes.

The catalyst is used in a catalytic amount, which is preferably 0.001 to 0.1% by weight, more preferably 0.01 to 0.1% by weight of platinum group metal based on the total weight of the compounds (exclusive of the solvent) used in the addition polymerization.

In the addition polymerization, a solvent may be used, if desired. Suitable solvents are hydrocarbon solvents such as toluene and xylene. The reaction temperature is preferably in a range of 40 to 150° C., more preferably 60 to 120° C., within which the catalyst is not deactivated and the polymerization can be completed within a short time. The polymerization time varies with the type and amount of the Mw of the resulting resin can be controlled using a molecular weight control agent such as a monoallyl compound (e.g., o-allylphenol), monohydrosilane (e.g., triethylhydrosilane) or monohydrosiloxane.

The general method of preparing polybenzoxazole resins involves the steps of reacting a carboxylic acid compound and a bisaminophenol compound to form a polyamide intermediate and subjecting it to a ring-closing reaction at a high temperature of at least 150° C. to form polybenzoxazole. The method suffers from rigorous reaction conditions and time consumption. In contrast, the inventive method is simple and efficient to produce the target compound.

The benzoxazole compound having formula (2-A) may be obtained from oxazine ring synthesis by reacting a compound having the formula (2-B), a compound having the formula (2-C), and a compound having the formula (2-D) shown below.

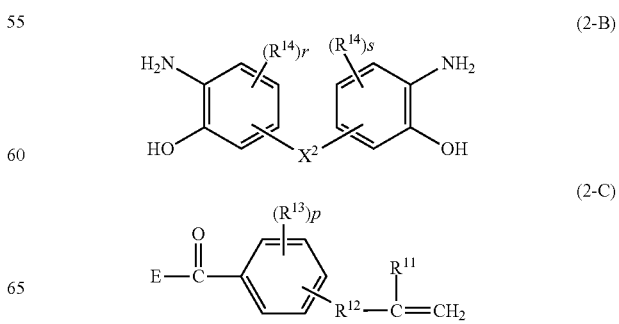

-continued

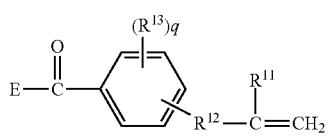
(2-D)

In formulae (2-B) to (2-D), $R^{11}$ to $R^{14}$, $X^2$, p, q, r and s are as defined above and E is a leaving group selected from a hydrogen atom, hydroxyl group, halogen atom, a straight, branched or cyclic $C_1$-$C_8$ alkoxy group, and phenoxy group. The preferred leaving group is hydroxyl or phenoxy because the high leaving ability helps the reaction to be completed within a short time.

The reaction is performed in a solvent, if necessary. Suitable solvents include N-methyl-2-pyrrolidone, amide solvents, lactones, carbonates, esters, ethers, ketones, alcohols, urea solvents, sulfoxide solvents, sulfone solvents, and hydrocarbon solvents.

If necessary, a reaction accelerator such as polyphosphoric acid or carbodiimide may be used. In case the double bond can undergo cationic polymerization with the aid of acid, a polymerization inhibitor or the like may also be added.

The reaction temperature is preferably in a range of about 100 to about 250° C., more preferably about 150 to about 230° C., within which the reactants and product are not decomposed, and the reaction can be completed in high yields and within a short time. The reaction time varies with the type and amount of the target compound. A time of about 0.5 to about 100 hours, especially about 0.5 to about 30 hours is preferred for preventing moisture entry into the reaction system.

In the above reaction, the reactants are preferably combined in such amounts that the total amount of the compounds having formulae (2-C) and (2-D) may range from 2 to 3 moles, more preferably from 2 to 2.3 moles per mole of the compound having formula (2-B). The amounts of the compounds having formulae (2-C) and (2-D) used may be determined as appropriate depending on the target benzoxazole compound. It is also preferred for ease of preparation that the compounds having formulae (2-C) and (2-D) be identical.

The organopolysiloxane having formula (1-A) and the compound having formula (1-B) may be synthesized by conventional well-known methods or available as commercial products.

Silicone-Modified Polybenzoxazole Resin Coating

A silicone-modified polybenzoxazole resin composition is prepared by dissolving the silicone-modified polybenzoxazole resin in a solvent such as toluene, tetrahydrofuran, ethylene glycol butyl ether acetate or methyl ethyl ketone. The resin composition is applied to a substrate of a base material including a metal such as iron, copper, nickel or aluminum, or glass. The solvent is evaporated off to form a coating. The coating is then heated at a temperature in the range of preferably 40° C. to 400° C., and more preferably 80° C. to 250° C. for a time of preferably 0.01 to 30 hours, more preferably 0.1 to 20 hours, yielding a resin coating having a smooth surface and resistance to solvents such as alcohols, ketones, and toluene. The resin coating may have a thickness of preferably about 1 µm to about 1 cm, more preferably 10 µm to 500 µm although the thickness varies with a particular forming technique. The resin coating is characterized by good adhesion and tight bond to the underlying base material. The resin composition may contain one or more silicone-modified polybenzoxazole resins.

To the silicone-modified polybenzoxazole resin composition, a curing catalyst may be added for the purpose of promoting crosslinking reaction in the preparation of the resin coating. Suitable curing catalysts include organic peroxides, onium salts, and cation catalysts. Examples of the organic peroxide include benzoyl peroxide, 2,4-diisopropylbenzene hydroperoxide, dicumyl peroxide, diisobutyl peroxide, bis(4-tert-butylcyclohexyl) peroxide, tert-butyl peroxy isobutyrate, 2,2'-azobis(2-methyl-butyronitrile), dimethyl-2,2'-azobis(2-methylpropionate), and 2,2'-azobis [N-(2-propenyl)-2-methylpropionamide]. Examples of the onium salt include pyridinium p-toluenesulfonate, pyridinium m-nitrobenzenesulfonate, and benzyltriethylammonium chloride. Examples of the cation catalyst include p-toluenesulfonic acid, methyl p-toluenesulfonate, and p-xylenesulfonic acid. When used, the amount of the curing catalyst is not particularly limited. It may be used in a catalytic amount. Typically, the amount of the curing catalyst is about 0.1 to about 4 parts by weight per 100 parts by weight of the silicone-modified polybenzoxazole resin.

It is believed that the crosslinking and curing reaction mechanism is based on cleavage of endocyclic olefinic carbon-carbon double bonds which have not participated in the addition polymerization and/or terminal olefinic carbon-carbon double bonds remaining after the addition polymerization.

Also, an inorganic filler may be added to the silicone-modified polybenzoxazole resin composition, if necessary. Examples of the inorganic filler include fused silica, crystalline silica, alumina, carbon black, mica, clay, kaolin, glass beads, aluminum nitride, zinc oxide, calcium carbonate, and titanium oxide. These inorganic fillers may be used alone or in admixture of two or more. The amount of the inorganic filler added is preferably about 1 to about 500 parts by weight per 100 parts by weight of the silicone-modified polybenzoxazole resin, though not limited thereto.

Conductive particles may also be added to the silicone-modified polybenzoxazole resin composition, if necessary, for imparting electro-conductivity. Suitable conductive particles include particles of metal such as gold, silver, copper or nickel and particles of plastic or analogs which are covered on their surface with metal. The conductive particles may be used alone or in admixture of two or more. The amount of the conductive particles added is about 100 to about 1,000 parts by weight per 100 parts by weight of the silicone-modified polybenzoxazole resin, though not limited thereto.

Further, a carbon functional silane may be added to the silicone-modified polybenzoxazole resin composition, if necessary, in order to improve the adhesion and bond between a resin coating resulting from the resin composition and a base material. Examples of the carbon functional silane include γ-glycidoxypropyltrimethoxysilane, γ-aminopropyltrimethoxysilane, 2-(γ-aminopropyl)ethyltrimethoxysilane, and vinyltrimethoxysilane. The carbon functional silanes may be used alone or in admixture of two or more. The amount of the carbon functional silane added is typically about 0.1 to about 10 parts by weight per 100 parts by weight of the silicone-modified polybenzoxazole resin.

The silicone-modified polybenzoxazole resin also finds use as a laminate, which is obtained by applying the resin onto a substrate to form a film thereon. For example, the silicone-modified polybenzoxazole resin composition may be coated onto a substrate by any well-known method, and dried at room temperature to 250° C. to form a film. The film preferably has a thickness of 0.1 to 1,000 μm. The substrate is typically selected from glass, plastics such as acrylic resins, PET and epoxy resins, metals such as Si, Cu, Fe, and Al, and silicon compounds such as SiO$_2$ and SiN.

EXAMPLE

Examples of the invention are given below by way of illustration and not by way of limitation. Notably, the weight average molecular weight (Mw) is measured by gel permeation chromatography (GPC) versus monodisperse polystyrene standards using GPC columns TSKGEL Super HZM-H (Tosoh Corp.) under analytical conditions: flow rate 0.6 mL/min, tetrahydrofuran elute, and column temperature 40° C.

The compounds used in Examples and Comparative Examples are shown below. In the formulae, Ph stands for phenyl.

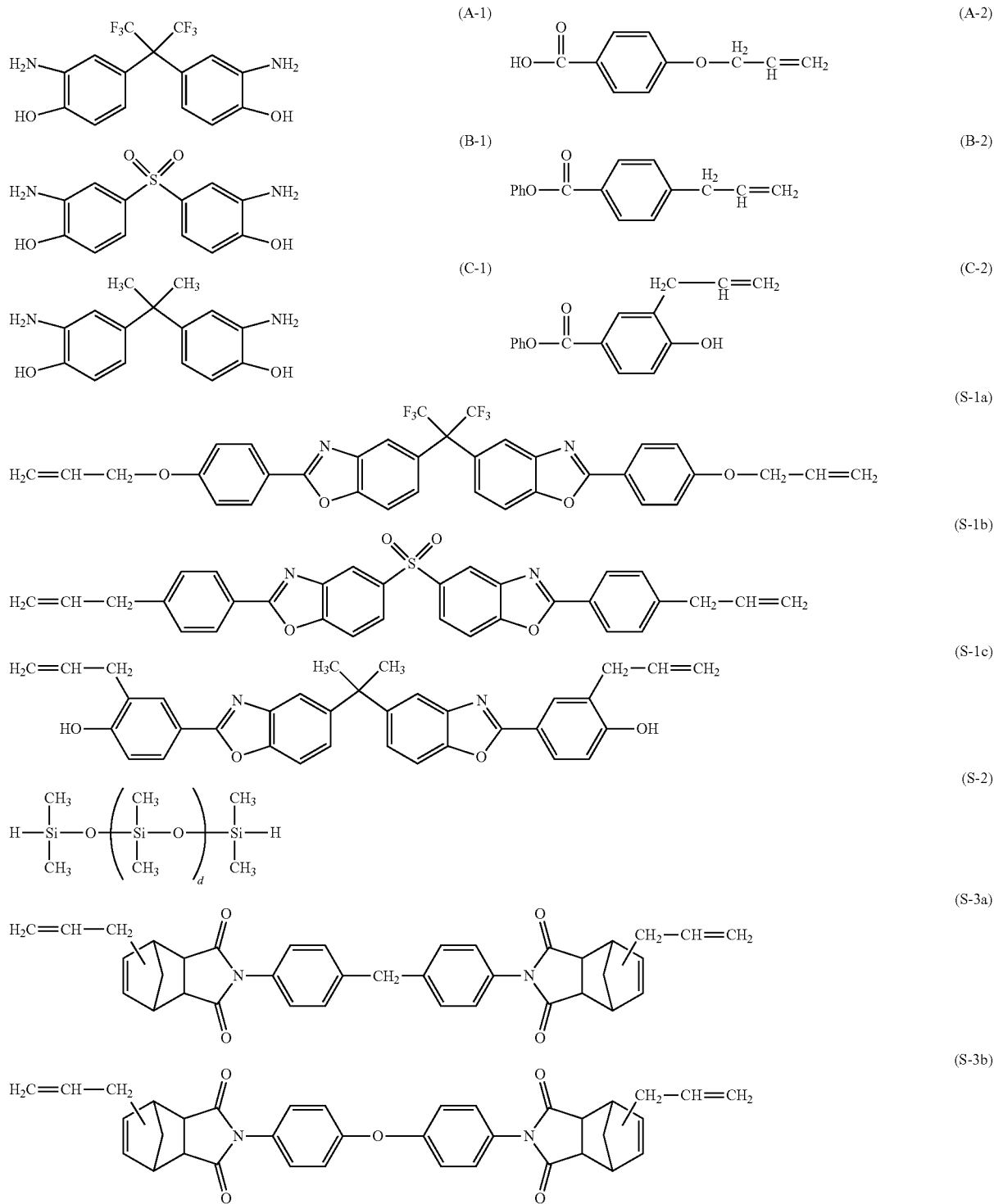

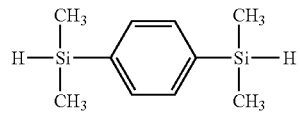
(S-4)

Synthesis of Benzoxazole Compounds

Example 1

Synthesis of Benzoxazole Compound S-1a

In a 300-mL four-neck flask, 35.6 g (0.20 mol) of Compound A-2 was dissolved in 50 g of γ-butyrolactone under a nitrogen stream. To the flask, a solution of 41.2 g (0.20 mol) of dicyclohexylcarbodiimide in 50 g of γ-butyrolactone was added dropwise at 5° C. The contents were stirred for 20 minutes at the temperature of 5° C., after which a solution of 36.6 g (0.10 mol) of Compound A-1 in 50 g of γ-butyrolactone was added dropwise at 5° C. The contents were stirred at 5° C. for 3 hours, then at room temperature for a further 10 hours. At the end of stirring, the reaction system was heated at 200° C. whereupon ring-closing dehydration or cyclodehydration reaction was rm for 20 hours. The cyclodehydration reaction was performed while removing water from the reaction system via a Dean-Stark trap. The reaction mixture was filtered to remove the by-product urea and recrystallized from isopropyl alcohol (pure water was added as a poor solvent). Finally the crystal was dried at 120° C. for 3 hours, obtaining 53.3 g of benzoxazole compound S-1a (yield 82.0%). The compound was analyzed by $^1$H-NMR and $^{13}$C-NMR (AV400M by Bruker Corp., solvent: toluene-$d_8$), with the data shown in Tables 1 and 2.

TABLE 1

| Peak | nH | Chem. Shifts/ppm |
|---|---|---|
| a | 2 | 7.37-7.61 |
| b | 2 | 7.51-7.98 |
| c | 2 | 7.79-7.99 |
| d | 2 | 7.78-8.12 |
| e | 2 | 6.75-7.17 |
| f | 2 | 6.75-7.17 |
| g | 2 | 7.78-8.12 |
| h | 4 | 4.56-4.58 |
| i | 2 | 6.09-6.10 |
| j | 2 | 5.30-5.32 |
| k | 2 | 5.43-5.45 |

TABLE 2

| Peak | CHn | Chem. Shifts/ppm |
|---|---|---|
| 1 | C | 162.47 |
| 2 | C | 145.23 |
| 3 | C | 148.22 |
| 4 | CH | 111.64 |
| 5 | CH | 131.6 |
| 6 | C | 129.28 |
| 7 | CH | 122.1 |
| 8 | C | 121.51 |
| 9 | CH | 128.92 |
| 10 | CH | 114.59 |
| 11 | C | 157.94 |
| 12 | CH | 114.59 |
| 13 | CH | 128.92 |
| 14 | C | 66.7 |
| 15 | C | 123.95 |
| 16 | CH2 | 68.84 |
| 17 | CH | 133.29 |
| 18 | CH2 | 117.56 |

TABLE 2-continued

| Peak | CHn | Chem. Shifts/ppm |
|---|---|---|

[Structure: vinyl ether-phenyl-benzoxazole-C(CF₃)₂-benzoxazole-phenyl-O-CH₂-CH=CH₂ compound with numbered positions 1-18, with position 15 labeled F₃C, CF₃]

Example 2

Synthesis of Benzoxazole Compound S-1b

In a 300-mL four-neck flask, 28.0 g (0.10 mol) of Compound B-1 and 47.6 g (0.20 mol) of Compound B-2 were dissolved in 100 g of N-methyl-2-pyrrolidone (NMP) under a nitrogen stream. The contents were heated at 180° C. for reaction while removing the by-product phenol from the reaction system under reduced pressure. After the reaction system was heated for 3 hours, it was restored to atmospheric pressure. It was then heated at 200° C. whereupon ring-closing dehydration or cyclodehydration reaction was run for 20 hours. The cyclodehydration reaction was performed while removing water from the reaction system via a Dean-Stark trap. The reaction solution was added to 1,000 mL of water for reprecipitation. The crystal precipitate was collected and washed with deionized water and methanol. Finally the crystal was dried at 120° C. for 3 hours, obtaining 45.3 g of benzoxazole compound S-1b (yield 85.2%). The $^1$H-NMR and $^{13}$C-NMR data are shown in Tables 3 and 4, respectively.

TABLE 3

| Peak | nH | Chem. Shifts / ppm |
|---|---|---|
| a | 2 | 7.24-7.90 |
| b | 2 | 7.70-8.05 |
| c | 2 | 7.98-8.56 |
| d | 2 | 8.09-8.42 |
| e | 2 | 6.96-7.69 |
| f | 2 | 6.96-7.69 |
| g | 2 | 8.09-8.42 |
| h | 4 | 3.27-3.36 |
| i | 2 | 5.89-6.01 |
| j | 2 | 5.00 |
| k | 2 | 5.01 |

[Structure: CH₂=CH-CH₂-O-phenyl-benzoxazole-SO₂-benzoxazole-phenyl-O-CH₂-CH=CH₂ compound with labeled positions a–k]

Table 4

| Peak | CHn | Chem. Shifts/ppm |
|---|---|---|
| 1 | C | 164.54 |
| 2 | C | 143.29 |
| 3 | C | 152.85 |
| 4 | CH | 110.68 |
| 5 | CH | 125.2 |
| 6 | C | 138.77 |
| 7 | CH | 119.59 |
| 8 | C | 125.87 |
| 9 | CH | 127.45 |
| 10 | CH | 128.47 |
| 11 | C | 140.25 |
| 12 | CH | 128.47 |
| 13 | CH | 127.45 |
| 14 | CH2 | 39.92 |
| 15 | CH | 137.42 |
| 16 | CH2 | 115.73 |

Table 4-continued

| Peak | CHn | Chem. Shifts/ppm |
|---|---|---|

[Structure: H₂C=CH—CH₂—O—C₆H₄—benzoxazole—SO₂—benzoxazole(positions 1-10)—C₆H₄(positions 8-13)—O—CH₂—CH=CH₂ (positions 14-16)]

Example 3

Synthesis of Benzoxazole Compound S-1c

In a 300-mL four-neck flask, 25.8 g (0.10 mol) of Compound C-1 and 50.8 g (0.20 mol) of Compound C-2 were dissolved in 100 g of NMP under a nitrogen stream. The contents were heated at 180° C. for reaction while removing the by-product phenol from the reaction system under reduced pressure. After the reaction system was heated for 3 hours, it was restored to atmospheric pressure. It was then heated at 200° C. whereupon ring-closing dehydration or cyclodehydration reaction was run for 20 hours. The cyclodehydration reaction was performed while removing water from the reaction system via a Dean-Stark trap. The reaction solution was added to 1,000 mL of water for reprecipitation. The crystal precipitate was collected and washed with deionized water and methanol. Finally the crystal was dried at 120° C. for 3 hours, obtaining 42.6 g of benzoxazole compound S-1c (yield 78.7%). The $^1$H-NMR and $^{13}$C-NMR data are shown in Tables 5 and 6, respectively.

TABLE 5

| Peak | nH | Chem. Shifts/ppm |
|---|---|---|
| a | 2 | 7.37-7.61 |
| b | 2 | 7.51-7.98 |
| c | 2 | 7.79-7.99 |
| d | 2 | 6.96-7.88 |
| e | 2 | 6.71-7.01 |
| f | 2 | 7.91-8.29 |
| g | 6 | 1.60-1.73 |
| h | 4 | 3.38-3.72 |
| i | 2 | 6.02-6.34 |
| j | 2 | 5.06-5.17 |
| k | 2 | 5.09-5.32 |
| l | 2 | 4.75-7.01 |

[Structure of benzoxazole compound S-1c with labeled positions a–l]

TABLE 6

| Peak | CHn | Chem. Shifts/ppm |
|---|---|---|
| 1 | C | 162.13 |
| 2 | C | 139.68 |
| 3 | C | 146.4 |
| 4 | CH | 110.23 |
| 5 | CH | 124.15 |
| 6 | C | 146.82 |
| 7 | CH | 119.97 |
| 8 | C | 121.57 |
| 9 | CH | 127.34 |
| 10 | C | 125.34 |
| 11 | C | 155.34 |
| 12 | CH | 115.41 |
| 13 | CH | 126.53 |
| 14 | C | 45.92 |
| 15 | CH3 | 30.77 |
| 16 | CH2 | 35.6 |
| 17 | CH | 136.91 |
| 18 | CH2 | 115.85 |

TABLE 6-continued

| Peak | CHn | Chem. Shifts/ppm |
|---|---|---|
| | (chemical structure: benzoxazole compound with positions labeled 1–18, including H, CH, CH₂, H₃C, CH₃, HO–, –OH, N, O) | |

Synthesis of Silicone-Modified Polybenzoxazole Resin

Example 4

Synthesis of Resin A

A 3-L flask equipped with a stirrer, thermometer, nitrogen purge line and reflux condenser was charged with 325.0 g (0.5 mol) of benzoxazole compound S-1a and 2,000 g of toluene and heated at 70° C. Thereafter, 1.0 g of a toluene solution of chloroplatinic acid (platinum concentration 0.5 wt %) was added, and 755.0 g (0.25 mol) of the compound having formula (S-2) wherein d=40 (Shin-Etsu Chemical Co., Ltd.) and 48.5 g (0.25 mol) of the compound having formula (S-4) (Shin-Etsu Chemical Co., Ltd.) were added dropwise over 1 hour. The molar ratio of the total amount of hydrosilyl groups to the total amount of alkenyl groups was 1/1. At the end of dropwise addition, the reaction solution was heated at 100° C. and aged for 6 hours. Toluene was distilled off in vacuum from the reaction solution, yielding Resin A. On $^1$H-NMR and $^{29}$Si-NMR (Bruker Corp.) spectroscopy, Resin A was identified to comprise repeating units of formulae (1a) and (1b). Resin A had a Mw of 42,000 and a silicone content of 67.0 wt %. In formulae (1a) and (1b), a=0.5 and b=0.5.

Example 5

Synthesis of Resin B

A 3-L flask equipped with a stirrer, thermometer, nitrogen purge line and reflux condenser was charged with 266.0 g (0.5 mol) of benzoxazole compound S-1b and 2,000 g of toluene and heated at 70° C. Thereafter, 1.0 g of a toluene solution of chloroplatinic acid (platinum concentration 0.5 wt %) was added, and 151.0 g (0.05 mol) of the compound having formula (S-2) wherein d=40 (Shin-Etsu Chemical Co., Ltd.) and 87.3 g (0.45 mol) of the compound having formula (S-4) (Shin-Etsu Chemical Co., Ltd.) were added dropwise over 1 hour. The molar ratio of the total amount of hydrosilyl groups to the total amount of alkenyl groups was 1/1. At the end of dropwise addition, the reaction solution was heated at 100° C. and aged for 6 hours. Toluene was distilled off in vacuum from the reaction solution, yielding Resin B. On $^1$H-NMR and $^{29}$Si-NMR spectroscopy, Resin B was identified to comprise repeating units of formulae (1a) and (1b). Resin B had a Mw of 44,000 and a silicone content of 30.0 wt %. In formulae (1a) and (1b), a=0.1 and b=0.9.

Example 6

Synthesis of Resin C

A 3-L flask equipped with a stirrer, thermometer, nitrogen purge line and reflux condenser was charged with 271.0 g (0.5 mol) of benzoxazole compound S-1c and 2,000 g of toluene and heated at 70° C. Thereafter, 1.0 g of a toluene solution of chloroplatinic acid (platinum concentration 0.5 wt %) was added, and 1057.0 g (0.35 mol) of the compound having formula (S-2) wherein d=40 (Shin-Etsu Chemical Co., Ltd.) and 29.1 g (0.15 mol) of the compound having formula (S-4) (Shin-Etsu Chemical Co., Ltd.) were added dropwise over 1 hour. The molar ratio of the total amount of hydrosilyl groups to the total amount of alkenyl groups was 1/1. At the end of dropwise addition, the reaction solution was heated at 100° C. and aged for 6 hours. Toluene was distilled off in vacuum from the reaction solution, yielding Resin C. On $^1$H-NMR and $^{29}$Si-NMR spectroscopy. Resin C was identified to comprise repeating units of formulae (1a) and (1b). Resin C had a Mw of 45,000 and a silicone content of 77.9 wt %. In formulae (1a) and (1b), a=0.7 and b=0.3.

Example 7

Synthesis of Resin D

A 3-L flask equipped with a stirrer, thermometer, nitrogen purge line and reflux condenser was charged with 325.0 g (0.5 mol) of benzoxazole compound S-1a and 2,000 g of toluene and heated at 70° C. Thereafter, 1.0 g of a toluene solution of chloroplatinic acid (platinum concentration 0.5 wt %) was added, and 396.3 g (0.25 mol) of the compound having formula (S-2) wherein d=20 (Shin-Etsu Chemical Co., Ltd.) and 48.5 g (0.25 mol) of the compound having formula (S-4) (Shin-Etsu Chemical Co., Ltd.) were added dropwise over 1 hour. The molar ratio of the total amount of hydrosilyl groups to the total amount of alkenyl groups was 1/1. At the end of dropwise addition, the reaction solution was heated at 100° C. and aged for 6 hours. Toluene was distilled off in vacuum from the reaction solution, yielding Resin D. On $^1$H-NMR and $^{29}$Si-NMR spectroscopy, Resin D was identified to comprise repeating units of formulae (1a) and (1b). Resin D had a Mw of 40,000 and a silicone content of 51.5 wt %. In formulae (1a) and (1b), a=0.5 and b=0.5.

Example 8

Synthesis of Resin E

A 3-L flask equipped with a stirrer, thermometer, nitrogen purge line and reflux condenser was charged with 266.0 g (0.5 mol) of benzoxazole compound S-1b and 2,000 g of toluene and heated at 70° C. Thereafter, 1.0 g of a toluene solution of chloroplatinic acid (platinum concentration 0.5 wt %) was added, and 396.3 g (0.25 mol) of the compound having formula (S-2) wherein d=20 (Shin-Etsu Chemical Co., Ltd.) and 48.5 g (0.25 mol) of the compound having formula (S-4) (Shin-Etsu Chemical Co., Ltd.) were added dropwise over 1 hour. The molar ratio of the total amount of hydrosilyl groups to the total amount of alkenyl groups was 1/1. At the end of dropwise addition, the reaction solution was heated at 100° C. and aged for 6 hours. Toluene was distilled off in vacuum from the reaction solution, yielding Resin E. On $^1$H-NMR and $^{29}$Si-NMR spectroscopy, Resin E was identified to comprise repeating units of formulae (1a) and (1b). The resin E has a Mw of 39,000 and a silicone content of 55.8 wt %. In formulae (1a) and (1b), a=0.5 and b=0.5.

Example 9

Synthesis of Resin F

A 3-L flask equipped with a stirrer, thermometer, nitrogen purge line and reflux condenser was charged with 271.0 g (0.5 mol) of benzoxazole compound S-1c and 2,000 g of toluene and heated at 70° C. Thereafter, 1.0 g of a toluene solution of chloroplatinic acid (platinum concentration 0.5 wt %) was added, and 396.3 g (0.25 mol) of the compound having formula (S-2) wherein d=20 (Shin-Etsu Chemical Co., Ltd.) and 48.5 g (0.25 mol) of the compound having formula (S-4) (Shin-Etsu Chemical Co., Ltd.) were added dropwise over 1 hour. The molar ratio of the total amount of hydrosilyl groups to the total amount of alkenyl groups was 1/1. At the end of dropwise addition, the reaction solution was heated at 100° C. and aged for 6 hours. Toluene was distilled off in vacuum from the reaction solution, yielding Resin F. On $^1$H-NMR and $^{29}$Si-NMR spectroscopy, Resin F was identified to comprise repeating units of formulae (1a) and (1b). Resin F had a Mw of 41,000 and a silicone content of 55.4 wt %. In formulae (1a) and (1b), a=0.5 and b=0.5.

Synthesis of Silicone-Modified Polyimide Resin

Comparative Example 1

Synthesis of Resin G

A 3-L flask equipped with a stirrer, thermometer, nitrogen purge line and reflux condenser was charged with 285.0 g (0.5 mol) of the compound having formula (S-3a) and 2,000 g of toluene and heated at 70° C. Thereafter, 1.0 g of a toluene solution of chloroplatinic acid (platinum concentration 0.5 wt %) was added, and 906.0 g (0.30 mol) of the compound having formula (S-2) wherein d=40 (Shin-Etsu Chemical Co., Ltd.) and 38.8 g (0.20 mol) of the compound having formula (S-4) (Shin-Etsu Chemical Co., Ltd.) were added dropwise over 1 hour. The molar ratio of the total amount of hydrosilyl groups to the total amount of alkenyl groups was 1/1. At the end of dropwise addition, the reaction solution was heated at 100° C. and aged for 6 hours. Toluene was distilled off in vacuum from the reaction solution, yielding Resin G. Resin G had a Mw of 44,000 and a silicone content of 73.7 wt %.

Comparative Example 2

Synthesis of Resin H A 3-L flask equipped with a stirrer, thermometer, nitrogen purge line and reflux condenser was charged with 286.0 g (0.5 mol) of the compound having formula (S-3b) and 2,000 g of toluene and heated at 70° C. Thereafter, 1.0 g of a toluene solution of chloroplatinic acid (platinum concentration 0.5 wt %) was added, and 317.0 g (0.20 mol) of the compound having formula (S-2) wherein d=20 (Shin-Etsu Chemical Co., Ltd.) and 58.2 g (0.30 mol) of the compound having formula (S-4) (Shin-Etsu Chemical Co., Ltd.) were added dropwise over 1 hour. The molar ratio of the total amount of hydrosilyl groups to the total amount of alkenyl groups was 1/1. At the end of dropwise addition, the reaction solution was heated at 100° C. and aged for 6 hours. Toluene was distilled off in vacuum from the reaction solution, yielding Resin H. Resin H had a Mw of 41,000 and a silicone content of 47.9 wt %.

Formation and Evaluation of Resin Coating

Examples 10 to 15 and Comparative Examples 3 and 4

Each of Resins A to H was dissolved in methyl ethyl ketone (MEK) at a concentration of 30 wt % to form a resin composition. From the resin composition, a resin coating was formed and evaluated as follows.

(1) Solvent Resistance Test

The resin composition (solution) was applied onto a glass substrate, then heated at 60° C. for 30 minutes and at 230° C. for a further 2 hours, forming a resin coating of 120 μm thick.

The coating on the glass substrate was immersed in MEK at 25° C. for 5 minutes. The coating surface was inspected for any change under an optical microscope. The results are shown in Table 7. The term "smooth surface" in Table 7 means that the resin coating surface does not deform or become ragged due to swelling in MEK.

(2) Adhesion Test

The resin composition (solution) was applied onto a copper substrate, glass substrate, silicon wafer, SiN wafer, SiO$_2$ wafer, acrylic resin plate, and epoxy resin plate, then heated at 60° C. for 30 minutes and at 230° C. for a further 2 hours, forming a resin coating of 25 μm thick on each substrate. The resin coating was allowed to stand in saturated water vapor at 2.1 atmospheres for 72 hours. The resin coating on each substrate was evaluated for adhesion after high humidity exposure by the cross-cut peeling test (JIS K5400). The results are shown in Table 7. In Table 7, the value represents the number of unpeeled sections per 100 cross-cut sections. Specifically, 100 means that all sections are kept intact or unpeeled, and 0 means that all sections are peeled off.

(3) Bend Following Test

The resin composition (solution) was applied onto a copper substrate, then heated at 60° C. for 30 minutes and at 230° C. for a further 2 hours, forming a resin coating of 25 μm thick. The test piece (resin coating on substrate) was examined for bend-following ability by bending it around a 2 mm diameter mandrel according to JIS K5600. The results are shown in Table 7. In terms of bend-following ability, the test piece was rated good "O" when the resin coating was not peeled off from the substrate or ruptured and poor "X" when the coating was peeled off from the substrate or ruptured.

TABLE 7

|  | Resin | Solvent resistance | Adhesion | | | | | | | Bend-following ability |
| --- | --- | --- | --- | --- | --- | --- | --- | --- | --- | --- |
|  |  |  | Cu | Glass | Si | SiN | SiO$_2$ | Acrylic resin plate | Epoxy resin plate |  |
| Example 10 | A | smooth surface | 100 | 100 | 95 | 89 | 82 | 88 | 100 | O |
| Example 11 | B | smooth surface | 100 | 100 | 88 | 89 | 81 | 85 | 100 | O |

| | Resin | Solvent resistance | Adhesion | | | | | Acrylic resin plate | Epoxy resin plate | Bend-following ability |
| | | | Cu | Glass | Si | SiN | SiO$_2$ | | | |
|---|---|---|---|---|---|---|---|---|---|---|
| Example 12 | C | smooth surface | 100 | 100 | 93 | 86 | 84 | 87 | 100 | ○ |
| Example 13 | D | smooth surface | 100 | 100 | 100 | 100 | 100 | 100 | 100 | ○ |
| Example 14 | E | smooth surface | 100 | 100 | 100 | 100 | 100 | 100 | 100 | ○ |
| Example 15 | F | smooth surface | 100 | 100 | 100 | 100 | 100 | 100 | 100 | ○ |
| Comparative Example 3 | G | ragged | 92 | 93 | 25 | 12 | 7 | 22 | 47 | X |
| Comparative Example 4 | H | smooth surface | 95 | 95 | 29 | 19 | 15 | 27 | 61 | ○ |

It has been demonstrated that the silicone-modified polybenzoxazole resin readily formed a resin coating by heat treatment. The resin coating had high resistance to organic solvents and exhibited good adhesion and bond to metal and other substrates and durability even under highly humid conditions. Therefore, the silicone-modified polybenzoxazole resin is useful for the surface protection of various metals and as a protective material for semiconductor devices and various substrates, an adhesive, and a heat resistant paint. The inventive method is simple and efficient to produce the target compound, silicone-modified polybenzoxazole resin.

Japanese Patent Application No. 2017-018371 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone-modified polybenzoxazole resin comprising repeating units having the formula (1a) and repeating units having the formula (1b):

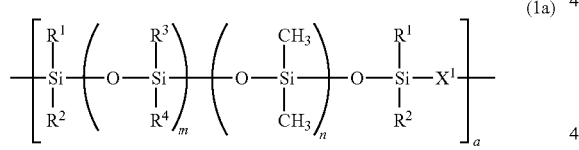

(1a)

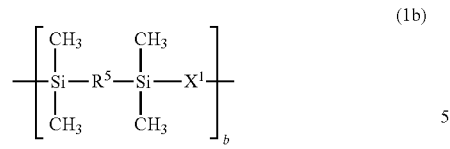

(1b)

wherein $R^1$ to $R^4$ are each independently a $C_1$-$C_8$ monovalent hydrocarbon group which may contain a glycidyl, acryloyl or methacryloyl moiety, m and n are each independently an integer of 0 to 300, $R^5$ is a straight, branched or cyclic $C_1$-$C_8$ alkylene group or phenylene group, a and b are positive numbers in the range: $0<a<1$, $0<b<1$, and $a+b=1$, and $X^1$ is a divalent linker having the following formula (2):

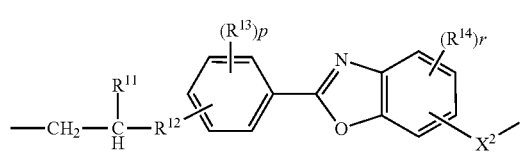

(2)

-continued

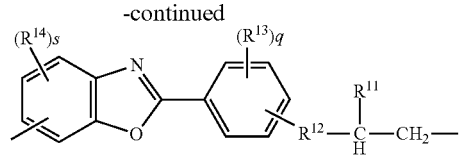

wherein $X^2$ is a single bond or divalent organic group, $R^{11}$ is each independently hydrogen or a $C_1$-$C_8$ monovalent hydrocarbon group in which some hydrogen may be substituted by halogen, $R^{12}$ is each independently a straight, branched or cyclic $C_1$-$C_8$ alkylene group in which any methylene moiety may be substituted by an ether bond or phenylene moiety, $R^{13}$ is each independently a hydroxyl, $C_1$-$C_8$ monovalent hydrocarbon or glycidyloxy group, $R^{14}$ is each independently a $C_1$-$C_8$ monovalent hydrocarbon group in which some hydrogen may be substituted by halogen, p and q are each independently an integer of 0 to 4, and r and s are each independently an integer of 0 to 3.

2. The silicone-modified polybenzoxazole resin of claim 1, having a weight average molecular weight of 3,000 to 500,000.

3. The silicone-modified polybenzoxazole resin of claim 1 wherein $X^2$ is a group selected from the following groups:

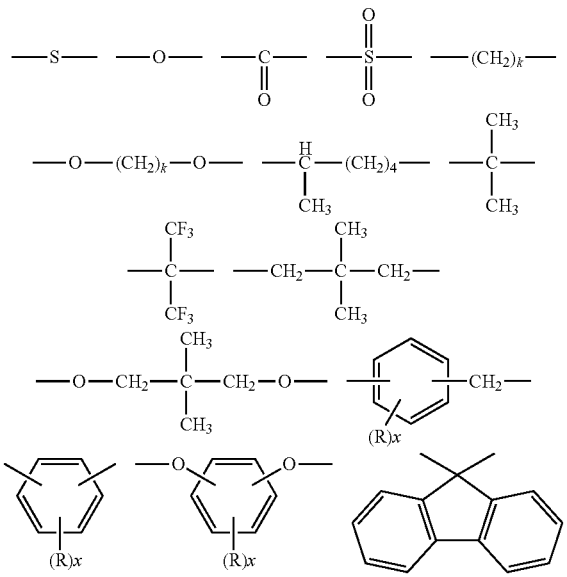

-continued

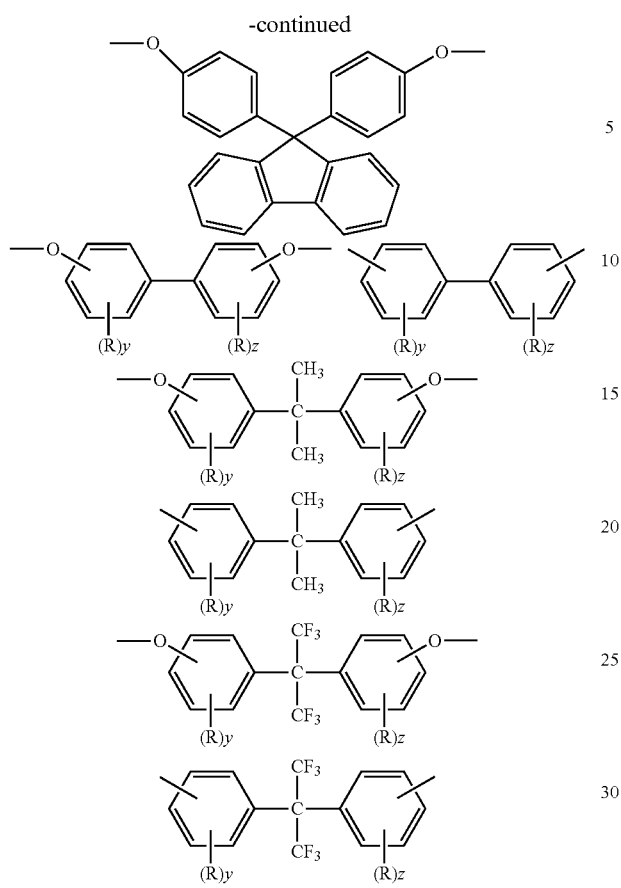

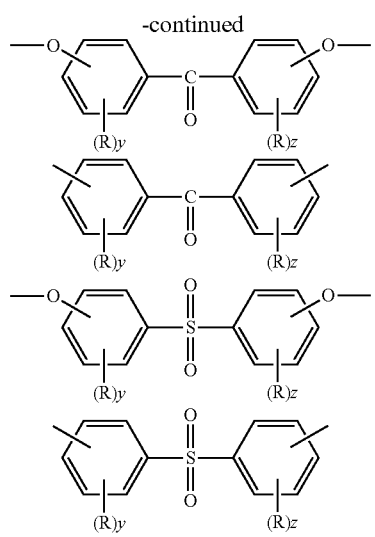

wherein R is each independently halogen, or a straight, branched or cyclic $C_1$-$C_8$ alkyl or haloalkyl group, k is an integer of 1 to 6, x is an integer of 0 to 4, and y and z are each independently an integer of 0 to 4.

4. A resin coating comprising the silicone-modified polybenzoxazole resin of claim 1.

5. A method for preparing the silicone-modified polybenzoxazole resin of claim 1, comprising the step of effecting addition polymerization of an organopolysiloxane having the following formula (1-A), a compound having the following formula (1-B), and a benzoxazole compound having the following formula (2-A),

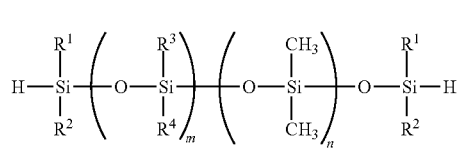 (1-A)

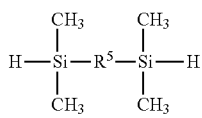 (1-B)

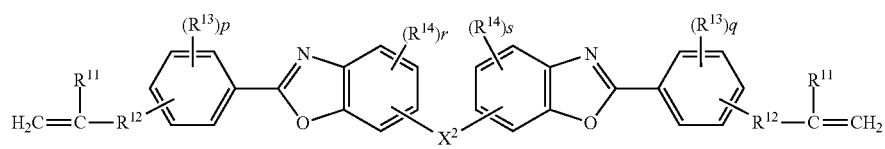 (2-A)

wherein $R^1$ to $R^5$, $R^{11}$ to $R^{14}$, $X^2$, m, n, p, q, r and s are as defined above.

* * * * *